United States Patent
Hojak et al.

(10) Patent No.: US 9,399,474 B2
(45) Date of Patent: Jul. 26, 2016

(54) METHOD FOR CONTROLLING A PNEUMATIC SPRING ASSEMBLY OF A MOTOR VEHICLE

(75) Inventors: Gerhard Hojak, Graz (AT); Klaus Six, Stainztal (AT); Martin Teichmann, Graz (AT)

(73) Assignee: Siemens AG Oesterreich, Vienna (AT)

( * ) Notice: Subject to any disclaimer, the term of this patent is extended or adjusted under 35 U.S.C. 154(b) by 1201 days.

(21) Appl. No.: 13/263,127

(22) PCT Filed: Mar. 29, 2010

(86) PCT No.: PCT/EP2010/054058
§ 371 (c)(1),
(2), (4) Date: Oct. 6, 2011

(87) PCT Pub. No.: WO2010/115739
PCT Pub. Date: Oct. 14, 2010

(65) Prior Publication Data
US 2012/0046830 A1    Feb. 23, 2012

(30) Foreign Application Priority Data

Apr. 7, 2009   (AT) .................. A543/2009

(51) Int. Cl.
*B61F 5/14*    (2006.01)
*B61F 5/24*    (2006.01)
(Continued)

(52) U.S. Cl.
CPC ............ *B61F 5/245* (2013.01); *B60G 17/0155* (2013.01); *B60G 17/0525* (2013.01); *B61F 5/14* (2013.01); *B60G 2400/104* (2013.01);
(Continued)

(58) Field of Classification Search
USPC .......... 280/124.158, 6.157, 5.5, 6.159, 5.514; 137/595, 488, 625; 701/37
See application file for complete search history.

(56) References Cited

U.S. PATENT DOCUMENTS 3,659,870 A * 5/1972 Okuyama .................. 280/6.158
5,393,087 A * 2/1995 Taniguchi .......... B60G 17/0155
280/5.514
(Continued)

FOREIGN PATENT DOCUMENTS

AT        503 256 A2     9/2007
AT        503256 A2      9/2007
(Continued)

OTHER PUBLICATIONS

Height and Leveling Control of Automotive Air Suspension System Using Sliding Mode Approach; Hyunsup Kim; Hyeongcheol Lee Vehicular Technology, IEEE Transactions on; vol. 60, Issue: 5; DOI: 10.1109/TVT.2011.2138730; Publication Year: 2011, pp. 2027-2041.*
(Continued)

*Primary Examiner* — Cuong H Nguyen
(74) *Attorney, Agent, or Firm* — Laurence Greenberg; Werner Stemer; Ralph Locher

(57) ABSTRACT

A method for controlling a pneumatic spring assembly of a motor vehicle includes deriving discrete condition parameters from a condition of the motor vehicle, wherein the discrete condition parameters are combined into parameter sets. Each parameter set is furthermore associated with a defined height control behavior, and wherein a height control behavior that is associated with a specific condition of the vehicle is set by activating at least one valve of the pneumatic spring assembly.

15 Claims, 1 Drawing Sheet

(51) Int. Cl.
*B60G 17/015* (2006.01)
*B60G 17/052* (2006.01)

(52) U.S. Cl.
CPC . *B60G2400/204* (2013.01); *B60G 2400/51222* (2013.01); *B60G 2500/30* (2013.01); *B60G 2500/302* (2013.01)

(56) References Cited

U.S. PATENT DOCUMENTS

| | | | |
|---|---|---|---|
| 5,432,700 | A | 7/1995 | Hrovat |
| 5,454,329 | A * | 10/1995 | Liprandi et al. ............ 105/199.2 |
| 6,293,562 | B1 * | 9/2001 | Kutscher .............. B60G 17/016 280/5.5 |
| 6,568,665 | B2 | 5/2003 | Foerster et al. |
| 6,616,116 | B1 * | 9/2003 | Rochau et al. ................ 248/564 |
| 7,066,474 | B2 * | 6/2006 | Hiebert et al. ............. 280/6.153 |
| 8,210,109 | B1 * | 7/2012 | Dewees ......................... 108/147 |
| 2003/0200016 | A1 | 10/2003 | Spillane et al. |
| 2005/0004732 | A1 | 1/2005 | Berry et al. |
| 2005/0040573 | A1 | 2/2005 | Bolt et al. |
| 2006/0272710 | A1 * | 12/2006 | Minervini ........... F16K 37/0033 137/487.5 |
| 2009/0133601 | A1 | 5/2009 | Kitzmuller et al. |

FOREIGN PATENT DOCUMENTS

| | | |
|---|---|---|
| AT | 503256 A3 | 6/2010 |
| CN | 1184040 A | 6/1998 |
| CN | 1365322 A | 8/2002 |
| CN | 1792655 A | 6/2006 |
| CN | 2816873 Y | 9/2006 |
| DE | 19544622 C1 | 9/1996 |
| DE | 29620200 U1 | 3/1998 |
| DE | 19647998 A1 | 5/1998 |
| DE | 102006005471 A1 | 8/2006 |
| EP | 0615890 A1 | 9/1994 |
| EP | 1355209 A1 | 10/2003 |
| GB | 2414816 A | 12/2005 |
| JP | 05193323 A | 8/1993 |
| WO | WO00/58125 * | 10/2000 |

OTHER PUBLICATIONS

Height and Leveling Control of Automotive Air Suspension System Using Sliding Mode Approach; H. Kim; H. Lee; IEEE Transactions on Vehicular Technology; Year: 2011, vol. 60, Issue: 5; pp. 2027-2041, DOI: 10.1109/TVT.2011.2138730.*

Osamu Tori, Development of a new control system for air springs of vehicle, vol. 30, No. 1, pp. 31-37, Jan. 1993, Foreign Railway Vehicle—Statement of Relevance.

International Search Report, Jul. 9, 2010, pp. 1-6.

Written Opinion of the International Searching Authority, Jul. 9, 2010, pp. 1-6.

* cited by examiner

METHOD FOR CONTROLLING A PNEUMATIC SPRING ASSEMBLY OF A MOTOR VEHICLE

CROSS REFERENCE TO RELATED APPLICATIONS

This application is the US National Stage of International Application No. PCT/EP2010/054058 filed Mar. 29, 2010, and claims the benefit thereof. The International Application claims the benefits of Austrian Patent Application No. A543/2009 AT filed Apr. 7, 2009. All of the applications are incorporated by reference herein in their entirety.

FIELD OF INVENTION

The invention relates to a method for controlling a pneumatic spring assembly of a vehicle.

BACKGROUND OF INVENTION

Pneumatic spring assemblies are usually used in rail vehicles as secondary springs between vehicle body and running gear for elastic support of the body. They largely decouple it from the irregularities of the rail system and make it possible to regulate out the changes in height of the body relative to the running gear frame caused by changes in load in stations.

A pneumatic spring for this purpose with an electro-pneumatic air control valve is known from DE 296 20 200 U1, in which, for regulating the height position of the vehicle body relative to the vehicle running gear frame, said position is recorded by a height sensor with an electrical output signal.

On the one hand this springing makes possible a precise detection of the height position, on the other hand the properties of the springing can be adapted to different modes of operation, so that when the vehicle is stationary for example, the emphasis is on the exact setting of the height position of the body relative to the running gear frame while by contrast, for dynamic stresses during the journey, a non-reaction to rolling movements can be achieved.

A pneumatic spring assembly is known from AT 503 256, in which a switching element is inserted into an air exchange line between a pneumatic control valve and the pneumatic spring, with which the airflow in the air exchange line can be throttled or interrupted, so that the properties of the height regulation of the pneumatic spring assembly are able to be adjusted for different settings.

SUMMARY OF INVENTION

An object of the claimed invention is to further develop the prior art and to provide a method for controlling a pneumatic spring assembly of a vehicle.

In accordance with the invention this is done with a method for controlling a pneumatic spring assembly of a vehicle, in which discreet state parameters, which are combined into parameter sets, are derived from the state of the vehicle, in which furthermore each parameter set is assigned a defined height regulation behavior and in which by corresponding control at least one valve of the pneumatic spring assembly is set to a height regulation behavior assigned to a specific state of the vehicle.

In accordance with the invention the state of a vehicle is described by a limited number of parameter sets, on the basis of which a resulting height regulation behavior is set.

A simple implementation of the method with electronically-controllable valves is thus made possible.

An important parameter for describing the state of a vehicle can be derived from a pressure value of the pneumatic spring assembly.

The operating mode of the vehicle, i.e. the question of whether the vehicle is stationary, on an incline, on an open track at high speed or low speed and also possibly how the state of the line itself is, is very important for the settings of the height regulation behavior.

It is especially advantageous, by controlling at least one valve of the pneumatic spring assembly, for a specific height of the body to be set in relation to the track, whereby the behavior of primary springing of the body is derived from a pressure value.

When the rail vehicle stops at a platform, raising the floor level of the body to the height of the edge of the platform is an important requirement. The fact that the invention takes account of the spring travel of the primary springing in setting the height regulation behavior enables this requirement to be met very precisely.

It is useful for at least one electronically-controllable proportional valve to be provided as the valve of the pneumatic spring assembly. Such valves, some with integrated pressure sensors, are simple to control and well proven as a result of being widely used.

To prevent air flowing unchecked into the pneumatic spring it is useful for a further valve to be provided, which is actuated in this case and prevents an unchecked raising of the body through release of air.

The invention will be explained in greater detail on the basis of an exemplary embodiment shown in the figures.

DETAILED DESCRIPTION OF INVENTION

Figure 1:
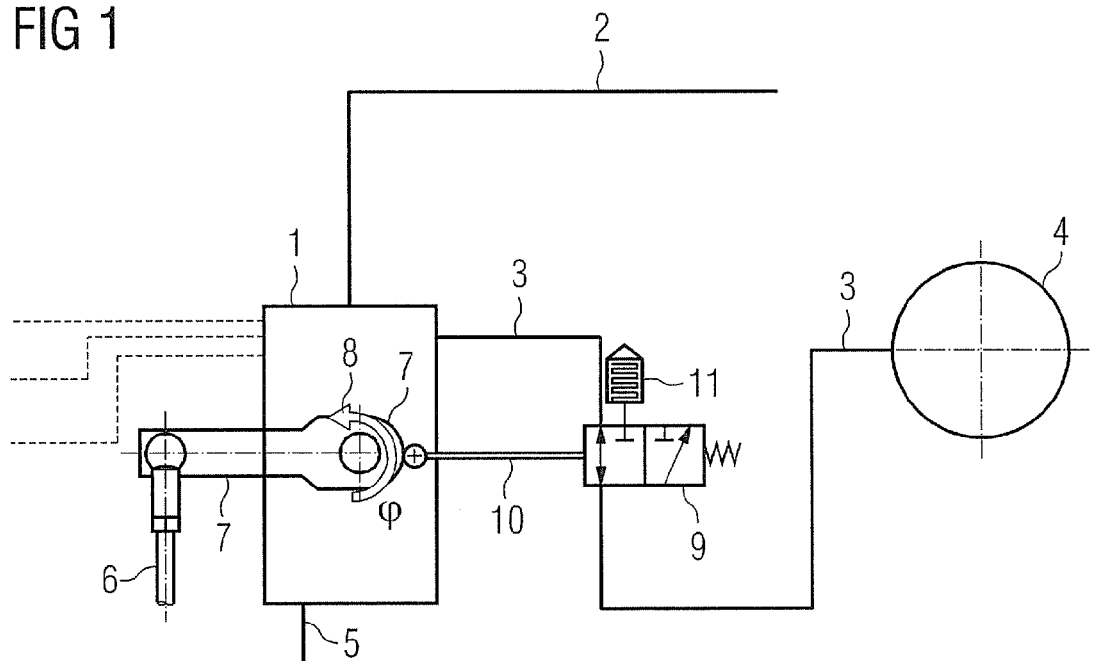
FIG. 1 the schematic layout of a pneumatic spring assembly

The pneumatic spring assembly according to FIG. 1 comprises an electronically-controllable proportional valve with integrated pressure sensor 1 and also an integrated control logic, which is implemented by means of microcontrollers for example.

The inflow of air from a reservoir not shown in the figure via a reservoir line 2 and a pneumatic spring line 3 to the pneumatic spring 4 or the outflow of air from the pneumatic spring 4 via the pneumatic spring line 3 and the outlet 5 into the surroundings and thus the height regulation behavior of the pneumatic valve 4 is controlled with this proportional valve 1.

The distance between the body and the running gear frame, the pressure in the valve and information about the operating mode of the vehicle serve as parameters for valve control.

The distance between the body and the running gear frame is converted via a measuring rod 6, 7 and an angle sensor 8 into an electrical input signal.

The pressure signal is determined by means of an integrated pressure sensor. This signal enables the load state of the vehicle to be deduced and the behavior of the primary springing calculated from this.

Thus it is also possible with the invention to determine the height of the body in relation to the track and to set this height exactly. This is especially important when the vehicle is standing in a station, to enable differences in level between the floor of the body and the platform edge to be avoided.

A rapid and precise height regulation is also required in this situation, i.e. the vehicle should be able to compensate as rapidly and as precisely as possible for spring movements caused by passengers joining and leaving the train.

This behavior associated with a high air requirement is undesirable while the vehicle is in motion, in this situation it is instead the jolting caused by irregularities in the track that should be compensated for as smoothly as possible by the passive springing properties of the pneumatic springs.

The operating modes of the vehicle, i.e. the different requirements on the vehicle in the station and during the journey, thus likewise represent a state parameter for controlling the height regulation behavior of the pneumatic spring assembly.

Inventively these values are converted into discrete state parameters with a restricted number of values and combined into a restricted number of parameter sets.

Figure 2:
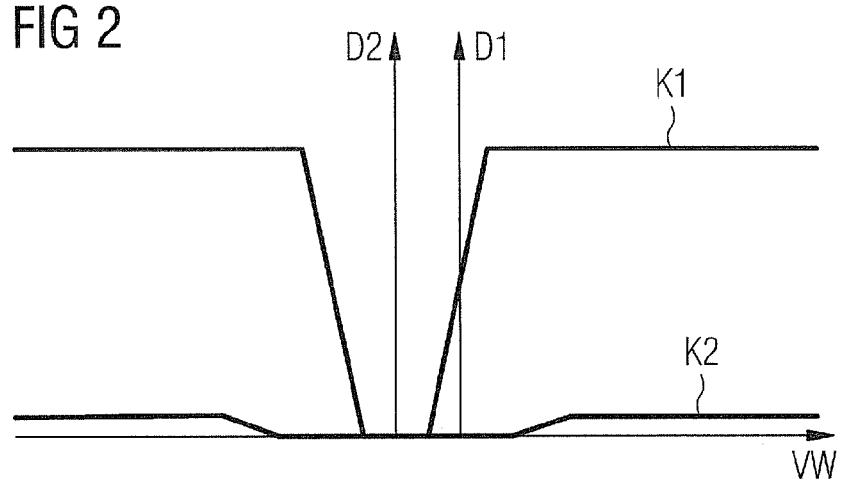
FIG. 2 the characteristic curve of a valve of the pneumatic spring assembly

Each parameter set is now allocated to a defined height regulation behavior which is essentially determined by the properties of the proportional valve 1 which are described approximately by the valve characteristic curves K1, K2 shown in FIG. 2.

It should be noted in this case that these valve characteristic curves K1, K2 do not have a linear shape but a defined stepped shape, through which the height regulation behavior will be explicitly predetermined.

The valve characteristic curves K1, K2 approximately describe the course of the valve throughflow D1, D2 as a function of valve angle VW, i.e. as a function of the height position of the body relative to the running gear frame. By changing the valve curve K1, K2 the height regulation behavior of the pneumatic spring assembly is changed. High throughflow amounts combined with a small area without throughflow, as shown in the first characteristic curve K1, cause a rapid and precise height regulation as required in the station area, while low throughflow amounts combined with a large area without throughflow in accordance with characteristic curve K2 are required during the journey.

The inventive account taken of the loading state of the vehicle or of the behavior of the primary springing leads in the graphical representation in accordance with FIG. 2 to the valve characteristic curve K1 being shifted left at the abscissa as a function of the measured pressure in the pneumatic spring system. This is represented by shifting the ordinate D2 from a second position which corresponds to the reference situation of the primary springing, to an ordinate D1 of the first position, in which as a result of a change in load the primary springing state deviates from the reference situation.

To prevent an unchecked flow of air into the spring in the event of an error a further valve 9 is inventively provided, which in this case is actuated by means of control rod 10 and prevents an unchecked raising of the body through the venting of air via a discharge line 11.

The invention claimed is:

1. A method for controlling a pneumatic spring assembly of a vehicle, comprising:
   deriving discrete state parameters based upon a state of a vehicle;
   combining the discrete state parameters into parameter sets;
   allocating a defined height regulation behavior to each parameter set; and
   electrically controlling a valve of the pneumatic spring assembly with an integrated control logic of the pneumatic spring assembly to set a specific height regulation behavior allocated to a specific state of the vehicle corresponding to a parameter set of the parameter sets, the integrated control logic deducing the specific state of the vehicle using electrical input signals.

2. The method as claimed in claim 1, wherein one of the discrete state parameters is derived from a pressure value of the pneumatic spring assembly.

3. The method as claimed in claim 2, wherein one of the discrete state parameters is derived from an operating mode of the vehicle.

4. The method as claimed in claim 1, wherein the valve of the pneumatic spring assembly is an electronically-controllable proportional valve.

5. The method as claimed in claim 4, wherein the electronically-controllable proportional valve comprises an integrated pressure sensor.

6. The method as claimed in claim 1, further comprising: providing a further valve which is actuated on unchecked inflow of air into a spring of the pneumatic spring assembly.

7. A method for controlling a pneumatic spring assembly of a vehicle, comprising:
   deriving discrete state parameters based upon a state of a vehicle;
   combining the discrete state parameters into parameter sets;
   allocating a defined height regulation behavior to each parameter set;
   controlling a valve of the pneumatic spring assembly such that a specific height regulation behavior, which has been allocated to a specific state of the vehicle corresponding to a parameter set of the parameter sets, is set.

8. The method as claimed in claim 7, wherein the valve of the pneumatic spring assembly is an electronically-controllable proportional valve.

9. The method as claimed in claim 8, wherein the electronically-controllable proportional valve comprises an integrated pressure sensor.

10. The method as claimed in claim 7, wherein one of the discrete state parameters is derived from a pressure value of the pneumatic spring assembly.

11. The method as claimed in claim 7, wherein one of the discrete state parameters is derived from an operating mode of the vehicle.

12. The method as claimed in claim 10, wherein one of the discrete state parameters is derived from an operating mode of the vehicle.

13. The method as claimed in claim 7, wherein one of the discrete state parameters is derived from a distance between a vehicle body and a vehicle running gear frame.

14. The method as claimed in claim 13, wherein, by controlling the valve of the pneumatic spring assembly, a specific height of the vehicle body in relation to a track is set, whereby a behavior of primary springing of the vehicle is derived from a pressure value of the pneumatic spring assembly.

15. The method as claimed in claim 7, further comprising: providing a further valve which is actuated on unchecked inflow of air into a spring of the pneumatic spring assembly.

* * * * *